(12) United States Patent
Kim et al.

(10) Patent No.: US 11,025,145 B2
(45) Date of Patent: Jun. 1, 2021

(54) QUADRANGULAR LEAF SPRING AND LINEAR VIBRATION MOTOR INCLUDING SAME

(71) Applicant: MPLUS CO., LTD., Suwon-si (KR)

(72) Inventors: Nam Sock Kim, Suwon-si (KR); Seok Jun Park, Suwon-si (KR); Tae Hoon Lee, Suwon-si (KR); Dong Jun Lee, Suwon-si (KR)

(73) Assignee: MPLUS CO., LTD., Suwon-si (KR)

( * ) Notice: Subject to any disclaimer, the term of this patent is extended or adjusted under 35 U.S.C. 154(b) by 85 days.

(21) Appl. No.: 16/250,241

(22) Filed: Jan. 17, 2019

(65) Prior Publication Data

US 2019/0238038 A1 Aug. 1, 2019

(30) Foreign Application Priority Data

Feb. 1, 2018 (KR) .................... 10-2018-0012795

(51) Int. Cl.
*H02K 33/02* (2006.01)
*F16F 1/18* (2006.01)
*H02K 33/16* (2006.01)

(52) U.S. Cl.
CPC ............. *H02K 33/02* (2013.01); *F16F 1/185* (2013.01); *H02K 33/16* (2013.01)

(58) Field of Classification Search
CPC ......... H02K 33/02; H02K 33/16; F16F 1/185; F16F 1/326; F16F 1/26
USPC ..................................................... 310/29, 81
See application file for complete search history.

(56) References Cited

U.S. PATENT DOCUMENTS

| 8,213,644 B2 * | 7/2012 | Choi ........................ H04R 9/06 381/151 |
| 8,692,423 B2 * | 4/2014 | Hong ..................... H02K 33/16 310/15 |
| 9,915,802 B2 * | 3/2018 | Murakami ............... G03B 5/00 |
| 10,451,834 B2 * | 10/2019 | Osaka ................ H02K 41/0356 |

(Continued)

FOREIGN PATENT DOCUMENTS

| CN | 105846638 A | 8/2016 |
| CN | 205503839 U | 8/2016 |

(Continued)

OTHER PUBLICATIONS

SIPO Office Action in connection with Chinese Patent Application No. 201910082205.1, dated May 26, 2020.

(Continued)

*Primary Examiner* — Ahmed Elnakib
(74) *Attorney, Agent, or Firm* — LRK Patent Law Firm (57) ABSTRACT

A quadrangular leaf spring of a quadrangle for generating vibration within a linear vibration motor includes a bottom support having an outer edge of a square form, a top support having a given height with respect to the bottom support and moved up and down by an elastic force of an elastic leg part, and the elastic leg part connected to an inside of the bottom support and upward extended up to the top support. A portion where the elastic leg part and the bottom support are connected is closer to a corner than to a center of each side of the bottom support. A right line of a portion of the elastic leg part connected to the bottom support is extended from the bottom support to the upper side in a concave shape with respect to the center of the leaf spring.

6 Claims, 7 Drawing Sheets

(56) References Cited

U.S. PATENT DOCUMENTS

| | | | | |
|---|---|---|---|---|
| 2011/0101797 A1* | 5/2011 | Lee | ........................ | H02K 33/16 |
| | | | | 310/29 |
| 2013/0134804 A1* | 5/2013 | Kim | ........................ | B06B 1/045 |
| | | | | 310/25 |
| 2014/0216064 A1* | 8/2014 | Champagne | ............ | F04B 39/10 |
| | | | | 62/6 |
| 2017/0123180 A1* | 5/2017 | Osaka | .................. | H04N 5/2254 |
| 2019/0006926 A1* | 1/2019 | Zhu | ........................ | H02K 33/02 |
| 2019/0238038 A1* | 8/2019 | Kim | ........................ | H02K 33/02 |

FOREIGN PATENT DOCUMENTS

| | | | |
|---|---|---|---|
| CN | 205566066 U | | 9/2016 |
| CN | 106329870 | * | 1/2017 |
| CN | 106329870 A | | 1/2017 |
| JP | H11-192455 A | | 7/1999 |
| JP | 2001-173697 A | | 6/2001 |
| JP | 2002-361174 A | | 12/2002 |
| KR | 200447398 | * | 1/2010 |
| KR | 200447398 Y1 | | 1/2010 |
| KR | 10-2010-0119970 A | | 11/2010 |
| KR | 10-1078597 B1 | | 11/2011 |
| KR | 20110123162 A | | 11/2011 |
| KR | 10-2013-0059684 A | | 6/2013 |
| WO | WO 2018026231 | * | 2/2018 |

OTHER PUBLICATIONS

SIPO Office Action in connection with Chinese Patent Application No. 201910082205.1, dated Jan. 20, 2021.

* cited by examiner

FIG. 11

QUADRANGULAR LEAF SPRING AND LINEAR VIBRATION MOTOR INCLUDING SAME

CROSS REFERENCE TO RELATED APPLICATION

The present application claims the benefit of Korean Patent Application No. 10-2018-0012795, filed in the Korean Intellectual Property Office on Feb. 1, 2018, the entire content of which is incorporated herein by reference.

BACKGROUND OF THE INVENTION

1. Field of the Invention

The present invention relates to an quadrangular leaf spring and a linear vibration motor including the same and, more particularly, to a quadrangular leaf spring capable of widening the area and reducing stress compared to the existing circular leaf spring by providing an elastic force to the vibrator of a linear vibration motor and forming the leaf spring of a quadrangular shape to generate vibration and a linear vibration motor including the same.

2. Description of Related Art

In general, communication devices, such as mobile communication terminals, have a vibration function for various purposes. The vibration function is for enabling a user to recognize the corresponding function by generating vibration when an operation, such as an incoming call, a button manipulation or a touch, is performed along with a vocalization function, such as melody, a bell or voice.

In order to apply such a vibration function to a device, in general, a small vibration motor positioned within the device is driven so that a corresponding driving force is delivered to the casing of the device and vibrates the device.

A vibration motor applied to communication devices, specifically, a mobile communication terminal, such as a mobile phone, is divided into a coin type having a thin thickness, a bar type of a long shape, and a linear type of a plane shape depending on the shape of the motor.

The coin type or the bar type includes a brush, a rectifier, a bearing, a vibrator, a magnet, etc. and is a type in which vibration is generated through a rotation movement. The type has a problem in that the abrasion of the brush, rectifier and bearing occurs when the motor is rotated. In order to solve the problem, the linear vibration motor of a plane shape using a vertical movement was developed.

The linear vibration motor basically includes a weight and an actuator in which a leaf spring structure supporting the weight is designed to vibrate at a specific resonant frequency. The linear vibration motor is driven through an interaction with a permanent magnet by applying sign power approximate to a resonant frequency to an electromagnet of a winding coil form. In order to maximize vibration power, a sufficient space must be internally secured in order to move and accelerate the weight, and the linear vibration motor must be externally designed in a thin size in order to satisfy the slimness of a customer (terminal manufacturer). Furthermore, a printed circuit board must be fixed to a bracket in order to stably apply power to the device.

Figure 1:
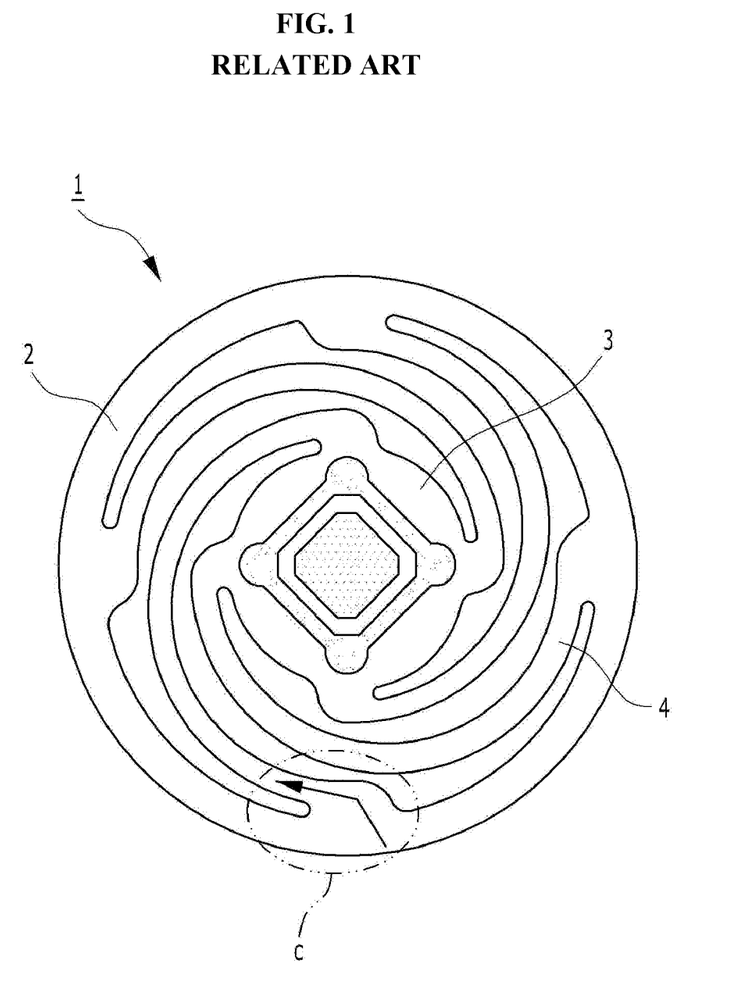
FIG. 1 is a plan view of a conventional leaf spring.

As in FIG. 1, a leaf spring includes an outside fixing end 2 fixed to a casing or bracket (not shown), a motion part 3 coupled to a weight or yoke (not shown) to move up and down, and an elastic leg part 4 positioned between the outside fixing end 2 and the motion part 3 to generate vibration by an elastic force.

Figure 2:
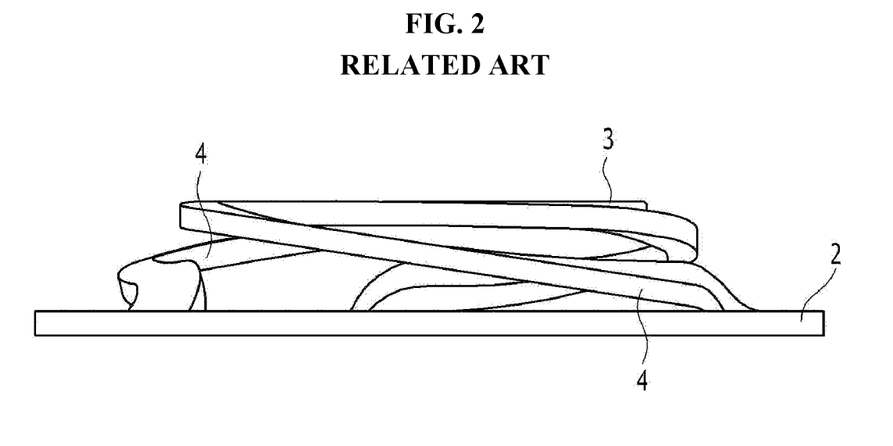
FIG. 2 is a side view showing the state before the conventional leaf spring operates.
Figure 3:
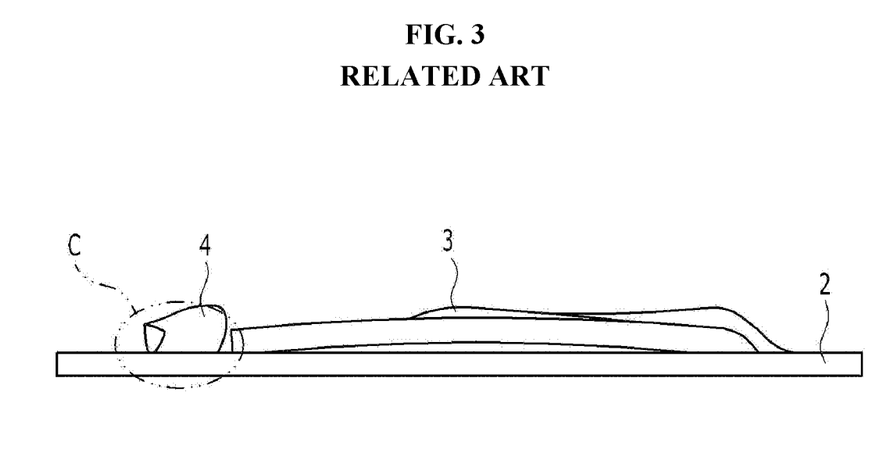
FIG. 3 is a side view showing the state after the conventional leaf spring operates.

The driving operation of a conventional circular leaf spring is described with reference to FIG. 2 or 3. The motion part 3 of the circular leaf spring is elastically supported by the three elastic leg parts 4 to move up and down. In this case, when the motion part 3 moves downward, a portion C close to the outside fixing end 2 of the elastic leg part 4 always maintains a constant shape regardless of a position according to the downward motion of the motion part 3.

That is, in a known linear vibration generation device, the motion part 3 of the leaf spring moves up and down to provide a constant vibration distance. The conventional leaf spring has a circular shape, and thus has a shape in which the connection part of the outside fixing end 2 and the elastic leg part 4 is bent (shown in FIGS. 1 and 3) so that the elastic leg part 4 forms curvature. Accordingly, the portion C (shown in FIG. 3) not moved when the conventional leaf spring is vibrated is present in the elastic leg part 4 on the part of the outside fixing end 2. As a result, this results in a problem in that a loss of vibration power is caused by reducing the vibration range and noise attributable to a contact with other parts within the linear vibration generation device occurs. The problem has a negative influence on the durability of the device.

Furthermore, in order to extend the fatigue lifespan of the conventional circular leaf spring, driving stress of the leaf spring must be improved. Stress may be reduced by increasing a total length of the leaf spring or increasing the width of a start part on the inside and outside, but the design is not easy due to a limited space.

Furthermore, in the conventional circular leaf spring of a bending type, if only the length of the bending type spring is simply increased, there are problems in that the weight and the casing are brought into contact and noise occurs because a rotation phenomenon occurs in the weight when the device moves up and down.

PRIOR ART DOCUMENT

Patent Document (Patent Document 1) Korean Patent Application Publication No. 10-2013-0059684

SUMMARY OF THE INVENTION

The present invention provides a quadrangular leaf spring, which can increase the area of the leaf spring compared to a conventional circular leaf spring because a target vibrating within a linear vibration motor is elastically supported and the leaf spring configured to generate up and down vibration is formed in a quadrangle or a shape close to a quadrangle (hereinafter collectively called a "quadrangular"), can improve quality of a product by reducing stress per unit leg and stress of the leaf spring because the number of legs of an elastic leg part is increased, can solve a problem in that the vibration width of a vibrator is reduced by maintaining a constant height without falling further when the leaf spring is contracted due to the structural limit of the circular leaf spring, and can reduce noise attributable to the left and right fluctuation contact of a weight within the vibration motor and a casing, and a linear vibration motor using the quadrangular leaf spring.

A quadrangular leaf spring according to an embodiment of the present invention includes a bottom support having an outer edge of a square form, a top support having a given height with respect to the bottom support and moved up and down by an elastic force of an elastic leg part, and the elastic leg part connected to an inside of the bottom support and upward extended up to the top support. When viewed from a plan view of the leaf spring, a portion where the elastic leg part and the bottom support are connected is closer to a corner than to a center of each side of the bottom support, and a right line of a portion of the elastic leg part connected to the bottom support is extended from the bottom support to an upper side in a concave shape with respect to the center of the leaf spring.

An outer edge of the bottom support may have constant inside and outside widths so that the elastic leg part is positioned on the same line as the bottom support when the top support falls down.

The elastic leg part may stably provide an elastic force although the connection part of the elastic leg part and the bottom support is not protruded, and may be connected at each quadrangular corner part of the bottom support so that the leg part falls down up to the position of the bottom support when the top support is vibrated downward.

The position connected at each quadrangular corner part may be closer to a corner on one side of the center of one of the sides of the bottom support.

Width at ends on both sides of the elastic leg part may be formed to constantly maintain an elastic force so that the top support is balanced and vibrated without leaning toward one side.

The elastic leg parts may be connected to the quadrangular corner parts of the bottom support, respectively, and may be formed in plural number. Specifically, four elastic leg parts may be formed.

The width of the top support may be formed to be narrowed toward the connection part of the top support and the elastic leg part in order to increase an elastic force.

The bottom support and the elastic leg part are connected without being bent so that the elastic leg part is not protruded upward when the elastic leg part moves downward.

In another embodiment of the present invention, there may be provided a linear vibration motor including the above-described quadrangular leaf spring.

The inside part of the weight of the linear vibration motor may be a circle, and the outside part thereof may be a quadrangle.

The quadrangular outside part of the weight may have a protrusion part (hereinafter called a "weight protrusion parts") at the central part of each side.

DETAILED DESCRIPTION

The present invention may be changed in various ways and may have various embodiments. Specific embodiments are illustrated in the drawings and are described in detail through the detailed description. It is however to be understood that the present invention is not intended to be limited to the specific embodiments and the present invention includes all changes, equivalents and substitutions which fall within the spirit and technological scope of the present invention.

In the drawings, embodiments of the present invention are not limited to specific forms illustrated in the drawings and have been enlarged for clarity. Specific terms have been used in the specification, but the terms are used to only describe the present invention, but are not used to limit the meaning of the terms or the range of right of the present invention written in the claim.

In the specification, an expression "and/or" is used as a meaning including at least one of elements listed front and back. Furthermore, an expression "connected/coupled" is used as a meaning including that one element is directly connected to the other element and that the two elements are connected by a third element. In the specification, the singular form may include the plural form unless specially described otherwise. Furthermore, terms, such as "includes or comprises" and/or "including or comprising" used in the specification, do not exclude the existence or addition of one or more elements, steps, operations and/or devices in the described elements, steps, operations and/or devices.

In the description of the present invention, when it is said that each layer (or film), area, pattern or structure is formed "over/on" or "under/below" each substrate, layer (or film), area, pad or structure, this includes both expressions, including that one element is directly formed on the other element and that a third element is interposed between the two elements. A criterion for the term "over/on" or "under/below" of each layer is described based on the drawings.

The embodiments of the present invention are described in detail with reference to the accompanying drawings.

Figure 4:
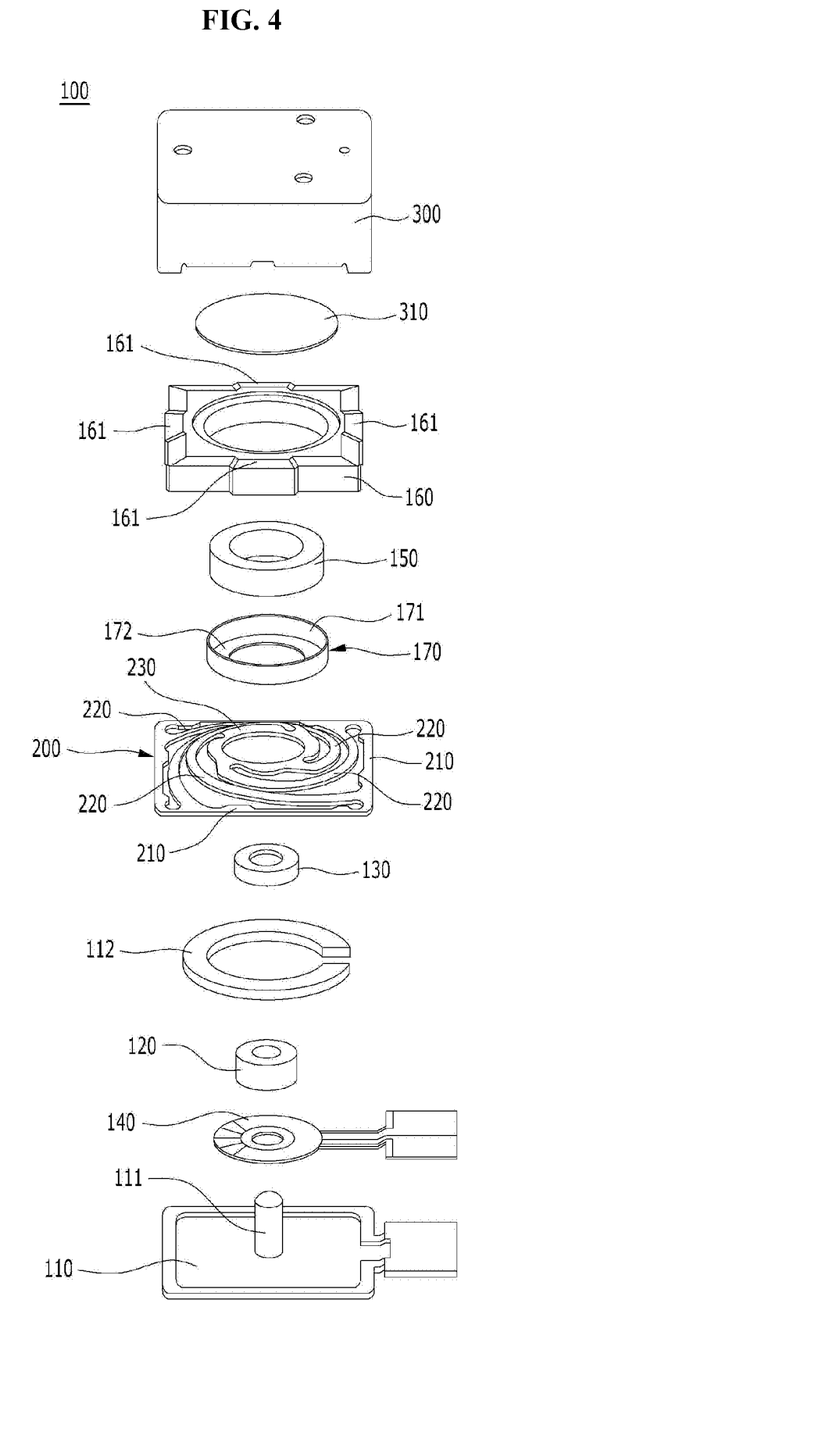
FIG. 4 is an exploded perspective view of a linear vibration motor according to an embodiment of the present invention.
Figure 5:
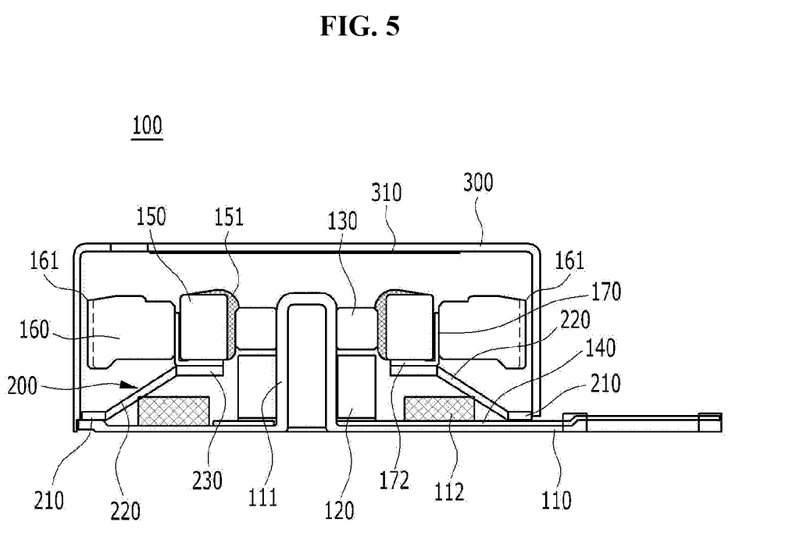
FIG. 5 is a coupled cross-sectional view of the linear vibration motor according to an embodiment of the present invention.
Figure 6:
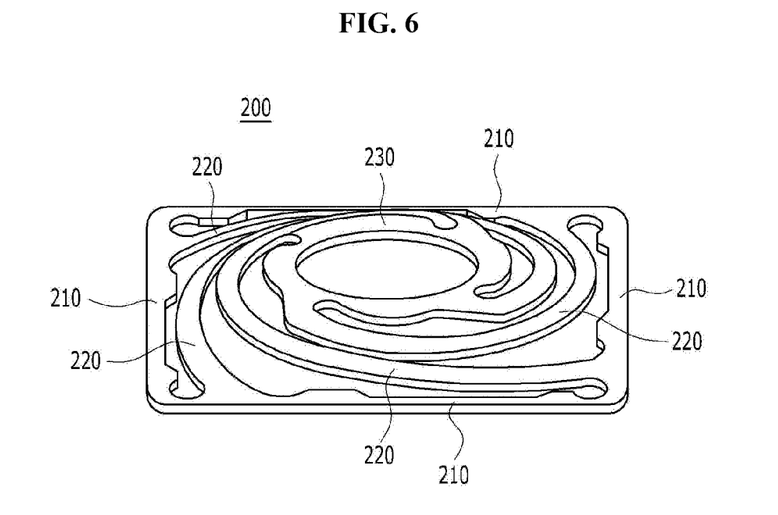
FIG. 6 is a perspective view showing the quadrangular leaf spring of the linear vibration motor according to an embodiment of the present invention.
Figure 7:
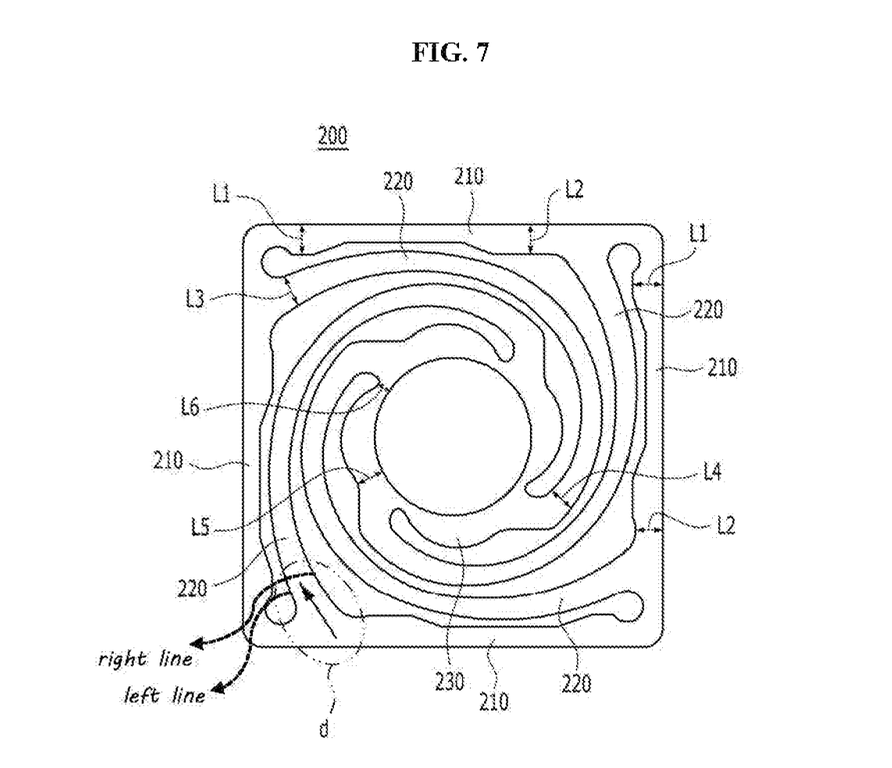
FIG. 7 is a plan view showing the quadrangular leaf spring of the linear vibration motor according to an embodiment of the present invention.
Figure 8:
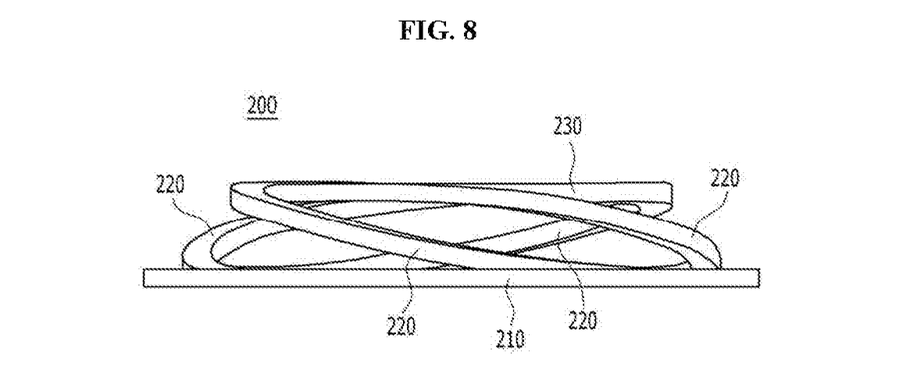
FIG. 8 is a side view showing the state before the quadrangular leaf spring of the linear vibration motor according to an embodiment of the present invention operates.
Figure 9:
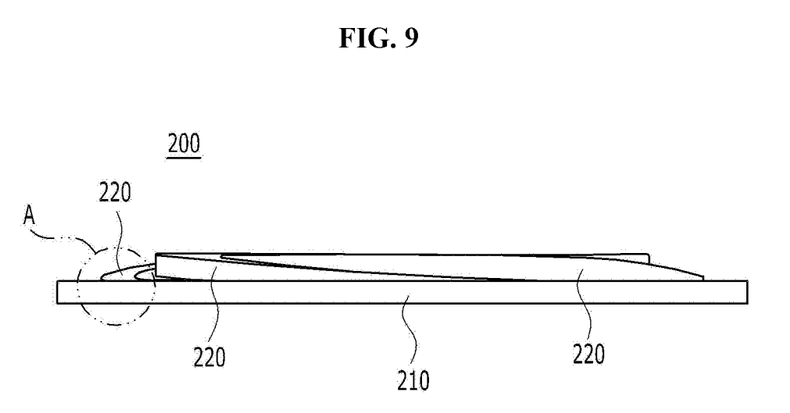
FIG. 9 is a side view showing the state after the quadrangular leaf spring of the linear vibration motor according to an embodiment of the present invention operates.
Figure 10:
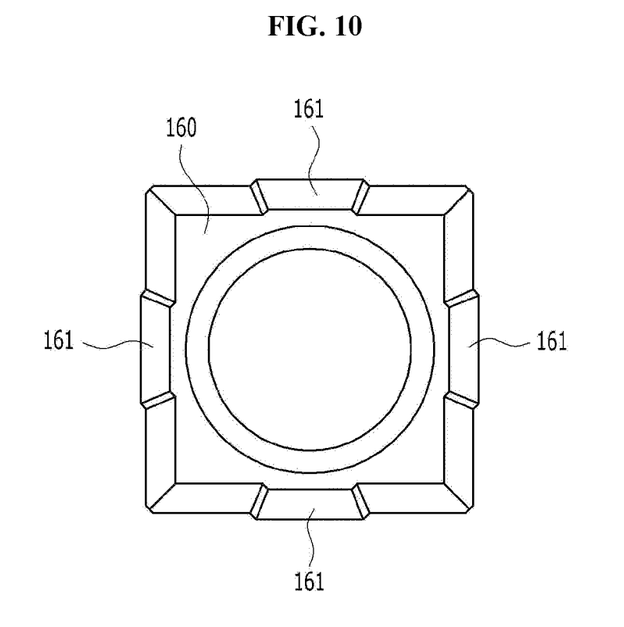
FIG. 10 is a plan view of the weight of the linear vibration motor according to an embodiment of the present invention.
Figure 11:
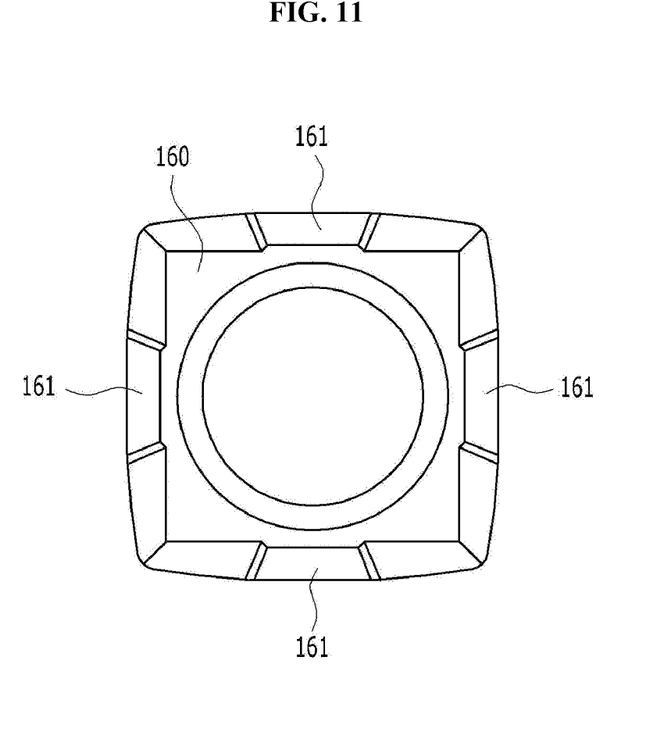
FIG. 11 is a plan view of the weight of the linear vibration motor according to another embodiment of the present invention.

FIG. 4 is an exploded perspective view of a linear vibration motor according to an embodiment of the present invention. FIG. 5 is a coupled cross-sectional view of the linear vibration motor according to an embodiment of the present invention. FIG. 6 is a perspective view showing the quadrangular leaf spring of the linear vibration motor according to an embodiment of the present invention. FIG. 7 is a plan view showing the quadrangular leaf spring of the linear vibration motor according to an embodiment of the present invention. FIG. 8 is a side view showing the state before the quadrangular leaf spring of the linear vibration motor according to an embodiment of the present invention operates. FIG. 9 is a side view showing the state after the quadrangular leaf spring of the linear vibration motor according to an embodiment of the present invention operates. FIG. 10 is a plan view of the weight of the linear vibration motor according to an embodiment of the present invention. FIG. 11 is a plan view of the weight of the linear vibration motor according to another embodiment of the present invention.

As shown in FIGS. 4 to 11, the linear vibration motor 100 according to an embodiment of the present invention includes a bracket 110, a coil 120, a yoke coil 130, a printed circuit board 140, a permanent magnet 150, a weight 160, a quadrangular leaf spring 200, a casing 300, and so on.

The bracket 110 has an outer circumferential surface of a quadrangle sheet and has a protrusion part 111 upward protruded at the center thereof.

Furthermore, a damper bracket 112 may be mounted over the bracket 110 in accordance with the printed circuit board 140.

The printed circuit board 140 is coupled to the outer circumferential surface of the protrusion part 111 over the bracket 110.

The printed circuit board 140 is widely commercialized, and a detailed structure and description thereof are omitted.

The coil 120 is coupled to the printed circuit board 140 for applying external power to the outer circumferential surface of the protrusion part 111 of the bracket 110.

The yoke coil 130 is positioned on the coil 120 and may be coupled to the outer circumferential surface of the protrusion part 111 of the bracket 110.

The permanent magnet 150 is positioned in the outer circumferential surface of the yoke coil 130.

Furthermore, the permanent magnet 150 may be coated with a magnetic fluid 151 to cover the inside circumference and top surface of the permanent magnet 150 connected to the yoke coil 130.

The weight 160 is provided on the outer circumferential surface of the permanent magnet 150 to amplify vibration power while maintaining the balance of the linear vibration motor 100.

Furthermore, the weight 160 has an outer circumferential surface of a quadrangular shape. The inner circumferential surface of the weight into which the permanent magnet 150 is inserted may be formed in a circular shape.

Furthermore, the weight 160 has an outer circumferential surface of a quadrangular shape, and a weight protrusion part 161 may be formed at the central part of each side.

The weight protrusion part 161 is a portion that may come into contact with a surrounding casing 300 due to the left and right fluctuation of the weight 160 upon vibration. If the weight protrusion parts 161 are not present, the fluctuation of the weight 160 is increased because a gap between the outer circumferential surface of the weight 160 and the casing 300 is increased and noise is increased because the entire wide surface of the weight 160 comes into contact with the casing 300. In order to solve the problems, the central part of each of all the quadrangular sides is protruded to reduce the fluctuation of the weight 160 by minimizing the gap with the casing 300 and also to reduce noise upon contact by reducing a contact area with the casing 300.

Furthermore, a support member 170 to support the permanent magnet 150 and the weight 160 may be included between the weight 160 and the permanent magnet 150.

The support member 170 has an outer circumferential surface of a circular shape to surround the outside of the permanent magnet 150. A seated part 171 may be formed within the support member 170 so that the permanent magnet 150 is safely positioned in the seated part.

Furthermore, a bottom piece 172 may be formed at the bottom of the support member 170 in order to support the permanent magnet 150 safely positioned in the seated part 171 from the bottom.

In this case, the bottom piece 172 is fixed to the top support 230 of the quadrangular leaf spring 200 by adhesion so that the permanent magnet 150 and the weight 160 can vibrate up and down in response to the up and down motions of the quadrangular leaf spring 200.

Furthermore, the bottom piece 172 may be formed in a hollow form so that the coil 120 and the yoke coil 130 can pass through the bottom piece.

The quadrangular leaf spring 200 is provided over the bracket 110, and moves the permanent magnet 150 up and down while elastically supporting the permanent magnet 150.

As shown in FIGS. 6 to 9, the quadrangular leaf spring 200 includes a bottom support 210, elastic leg parts 220 and the top support 230.

The bottom support 210 is mounted on the bracket 110, and may have an outer edge of an approximately square.

That is, each side of the bottom support 210 has a straight line or a very gentle curve close to a straight line. The corner of each side has a right angle or a round form close to a right angle.

Furthermore, the inside and outside widths of each outer edge of the bottom support 210 may be constant so that the elastic leg part 220 is positioned on the same line as the bottom support 210 when the elastic leg parts 220 move downward due to the fall of the top support 230.

That is, the inside and outside widths L1 and L2 of each side of the bottom support 210 have a minimum difference. Accordingly, when the elastic leg part 220 moves downward, the connection part of the bottom support 210 and the elastic leg part 220 is not protruded upward. As a result, contact noise can be prevented because interference does not occur between the quadrangular leaf spring 200 and the weight 160.

The elastic leg part 220 is integrated with the bottom support 210 at a given location within the bottom support 210. The elastic leg parts 220 may be configured with four legs, respectively, in the quadrangular bottom support 210 and extended to the top support 230 upward (direction upward from a surface of paper in FIG. 7).

Furthermore, as shown in FIG. 7, the connection part width L3 of the bottom support 210 and the elastic leg part 220 and the connection part width L4 of the elastic leg part 220 and the top support 230 are identical. Accordingly, when the elastic leg parts 220 move downward due to the fall of the top support 230, the connection part A (shown in FIG. 9) of the bottom support 210 and the elastic leg part 220 is not protruded upward.

Furthermore, the elastic leg part 220 is stably elastic although the connection part of the elastic leg part 220 and the bottom support 210 is not protruded, and is connected to a portion close to each quadrangular edge so that the elastic leg part 220 falls down to the position of the bottom support 210.

Furthermore, the widths L3 and L4 of the ends on both sides of the elastic leg part 220 are made identical. Accordingly, the top support 230 can move up and down stably without leaning toward one side because an elastic force is constantly maintained.

As shown in FIG. 7, the bottom support 210 and the elastic leg part 220 are connected without a portion bent so that the elastic leg parts 220 are not protruded upward when they move downward. From the plan view of FIG. 7, it may be seen that the portion where the elastic leg part and the bottom support are connected is closer to a corner than to the center of each side of the bottom support, and the right line of the elastic leg part connected to the bottom support is extended from the bottom support to the top in a concave shape with respect to the center of the leaf spring. Such a connection is compared to a case where in FIG. 1, the elastic leg part 4 of the conventional circular leaf spring extends from the outside fixing end 2, the right line of the elastic leg part has a portion convex toward the center of the leaf spring, and the right light is bent to the left and extended (refer to an arrow in C of FIG. 1).

That is, since the bottom support 210 has a quadrangular shape forming four sides, the elastic leg part 220 connected to a corner part of each side of the bottom support 210 is not bent once and connected as in the existing circular leaf spring, but can be connected and extended without a bent portion.

Furthermore, a connection part (i.e., a portion indicated by an arrow in "d" of FIG. 7) is not positioned at the center of each side of the bottom support 210, but is formed on one side of each side. The connection part is formed closer to a corner than to the center of each side.

The top support 230 is provided at the end of the elastic leg part 220 at a given height from the bottom support 210, and elastically supports the permanent magnet 150 and the weight 160 by the elastic force of the elastic leg part and moves up and down.

The width of the top support 230 is narrowed toward a connection part connected to the elastic leg part 220 in order to increase an elastic force.

That is, when the leaf spring moves up and down, the top support 230 can move downward to the position of the bottom support 210 because a width L6 on one side of the top support 230 connected to one elastic leg part 220 is narrower than a width L5 on the other side of the top support 230 connected to the other elastic leg part 220.

The casing 300 may be formed over the bracket 110 in a quadrangular box shape.

A damper casing 310 may be attached to the top of the casing 300 therein.

FIGS. 10 and 11 are plan views showing two embodiments of the weight according to embodiments of the present invention.

In FIGS. 10 and 11, the inside part of the weight 160 is a circle, and the outside part thereof is a quadrangle. Furthermore, the weight protrusion parts 161 are formed at the central parts of the sides of the outside part, respectively. In FIG. 10, some area at the edge of the top of the outside part may be inclined up to the side of the outside part. In this case, the weight protrusion part 161 may be formed on the side of the outside part or may be formed both on the side and inclined area of the top of the outside part.

The weight of FIG. 11 is different from that of FIG. 10 in that each of the four sides of the outside part has a more convex and round form. Each corner of the outside part has a round form, and areas on both sides of the central part of the outside part except the central part of each side have gentle curvature. In FIG. 11, the weight protrusion part 161 is formed at the central part of each side.

An operating state of the quadrangular leaf spring having such a structure according to an embodiment of the present invention and the linear vibration motor including the same is described below.

The area can be increased compared to the existing circular leaf spring because the bracket 110 in which the printed circuit board 140 is positioned and the casing 300 positioned over the bracket 110 are provided in a quadrangular form and the quadrangular leaf spring 200 is provided to support the permanent magnet 150 and a vibrator, such as the weight 160 over the bracket 110, and also to move up and down and generate vibration.

Furthermore, the bottom support 210 of the quadrangular leaf spring 200 attached to the upper part of the bracket 110 is provided in a quadrangular shape forming four sides, and the elastic leg parts 220 having the four legs are connected to the insides of portions close to the respective sides of the bottom support 210. Accordingly, stress per unit leg can be reduced because the number of legs is greater than the three legs of the existing circular leaf spring, and stress of the spring can be reduced because the length of the leg is increased in the same elastic modulus.

Furthermore, the length of the leg of the elastic leg part 220 is increased compared to the existing circular leaf spring because the number of legs is four. Accordingly, when the motor is driven, the amount of rotation of the weight 160 can be reduced, and a contact between the casing 300 and the weight 160 can be minimized.

The results of experiments of the quadrangular leaf spring 200 according to an embodiment of the present invention and the existing circular leaf spring are obtained as in Table 1.

TABLE 1

| Spring structure | Circle | Quadrangle | Relative ratio (quadrangle/circle) |
| --- | --- | --- | --- |
| Spring leg length (mm) | 9.89 | 11.54 | 117% |
| Amount of rotation of weight (mm) | 0.121 | 0.106 | 88% |

<Comparison in Leg Length and Amount of Rotation of Weight Between Circle and Quadrangular Leaf Springs>

As may be seen from Table 1, the quadrangular leaf spring 200 according to an embodiment of the present invention has an increased leg length and an increase amount of rotation of the weight 160 compared to the existing circular leaf spring.

Furthermore, the bottom support 210 has a quadrangle, the four elastic leg parts 220 are provided, the inside and outside widths L1 and L2 of the bottom support 210 maintain a minimum difference, the connection part of the bottom support 210 and the elastic leg part 220 is not protruded outward, and the widths L3 and L4 of the ends on both sides of the elastic leg part 220 maintain a constant minimum difference. Accordingly, when the elastic leg parts 220 move downward due to the fall of the top support 230, the connection part A of the bottom support 210 and the elastic leg part 220 is not protruded upward from the bottom support 210 and can drop to the same position as the bottom support 210.

Furthermore, when the elastic leg parts 220 move downward due to the fall of the top support 230, they can be compressed at the same position as the bottom support 210 because the bottom support 210 and the elastic leg part 220 are connected without a bent portion ("d" shown in FIG. 7). Accordingly, noise can be prevented because interference does not occur between the elastic leg parts 220 and other parts.

As described above, the quadrangular leaf spring and the linear vibration motor including the same according to embodiments of the present invention have the following advantages. The area can be increased compared to the existing circular leaf spring because the leaf springs elastically supporting a vibrator within the linear vibration motor has a quadrangle. Reliability and quality of a product can be improved due to reduce stress because the number of legs of the elastic leg parts and the length of the leg are increased. Furthermore, the vibration width of the leaf spring can be further increased, and the fluctuation of the weight and noise can be reduced because a contact between the casing and the weight is minimized when the motor is driven.

As described above, the present invention is not limited to the above-described specific embodiments and may be modified in various ways by a person having ordinary skill in the art to which the present invention pertains without departing from the gist of the present invention written in the claims. Such modifications or changes fall in the range of protection of the present invention.

What is claimed is:

1. A quadrangular leaf spring comprising:
   a bottom support having an outer edge of a square form;
   a top support having a given height with respect to the bottom support and moved towards and away from the bottom support by an elastic force of an elastic leg part; and
   the elastic leg part connected to an inside of the bottom support and upward extended up to the top support,
   wherein when seen from a top view of the quadrangular leaf spring, a portion where the elastic leg part and the bottom support are connected to each other is closer to a corner than to a center of each side of the bottom support,
   wherein a right line of the portion where the elastic leg part and the bottom support are connected to each other is formed to be concave with respect to a center of the quadrangular leaf spring and extended from the bottom support towards the top support, wherein the right line of the portion indicates a boundary line facing the center of the quadrangular leaf spring,
   wherein the elastic leg part is shaped to have curvature throughout a total length thereof.

2. The quadrangular leaf spring of claim 1, wherein a number of the elastic leg parts is 4.

3. The quadrangular leaf spring of claim 1, wherein widths L5 and L6 of the top support are narrowed toward a connection part of the top support and the elastic leg part to increase the elastic force.

4. A linear vibration motor comprising the quadrangular leaf spring according to claim 1.

5. The linear vibration motor of claim 4, wherein a weight positioned within the linear vibration motor has an inside part of a circle and an outside part of a quadrangle.

6. The linear vibration motor of claim 5, wherein the outside part has a weight protrusion part formed at a central part of each side.

* * * * *